United States Patent

[11] 3,539,102

[72] Inventor Robert J. Lang
 Watchung, New Jersey
[21] Appl. No. 692,546
[22] Filed Dec. 21, 1967
[45] Patented Nov. 10, 1970
[73] Assignee Esso Research and Engineering Company
 a corporation of Delaware

[54] PROCESS FOR THE GENERATION OF LIQUID FOGS
 4 Claims, 1 Drawing Fig.
[52] U.S. Cl. ..................................................... 239/4,
 239/434, 239/545
[51] Int. Cl. ..................................................... B05b 17/04
[50] Field of Search........................................... 239/4, 102,
 545(X), 434(X)

[56] References Cited
UNITED STATES PATENTS
3,421,692 1/1969 Babington et al. ............. 239/434
3,421,693 1/1969 Fraser ........................... 239/545
3,421,699 1/1969 Babington et al. ............. 239/434

Primary Examiner—Lloyd L. King
Attorney—Manahan and Wright

ABSTRACT: A true liquid fog is generated from a liquid spray by directing a jet of gas at sonic velocities at the orifice of the nozzle producing the liquid spray. The invention is particularly useful in the medical field of inhalation therapy and in the field of liquid combustion technology.

Patented Nov. 10, 1970
3,539,102
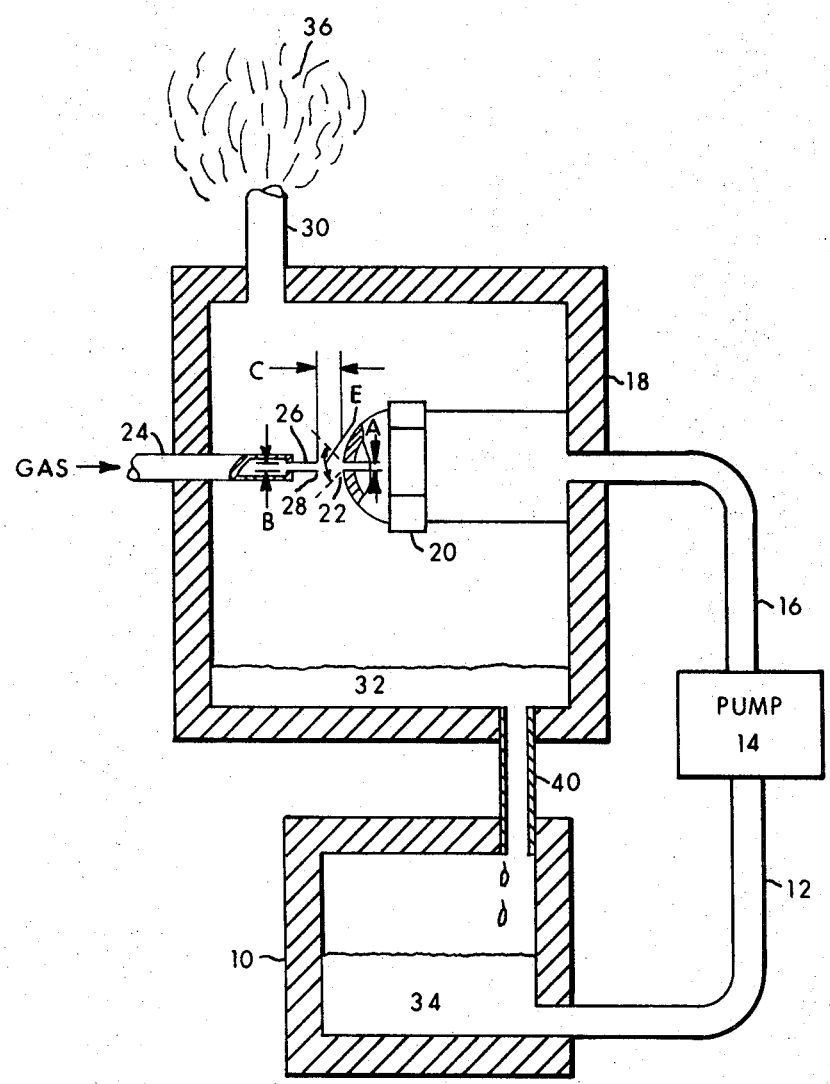
R. J. LANG  Inventor

PROCESS FOR THE GENERATION OF LIQUID FOGS

BACKGROUND OF THE INVENTION

This invention relates to the production of true liquid fogs. More particularly, it relates to a process and apparatus for generating true liquid fogs, especially liquid fogs which are suitable for use in inhalation therapy or in combustion or flame technology.

It has long been considered desirable to develop an economic and efficient means for producing true liquid fogs, i.e. a heterogeneous, stable mixture of a discontinuous phase of extremely finely divided liquid droplets suspended in a continuous gas phase. Great difficulties have been encountered however, generating such fogs. Attempts have been made to generate them by bombarding liquid sprays with ultrasonic sound waves. Unfortunately, the electronic equipment needed is very expensive, and the maintenance problems are extreme due to the need for frequent, skilled and expensive maintenance of such equipment. True liquid fogs have also been generated by heating and vaporizing a liquid and then allowing the vapor to condense under such conditions that a fog is produced. In many cases, however, the liquid component of the resulting fog does not contain all the components contained in the original liquid. For example, heavy components may not vaporize readily, and heat sensitive components may decompose, polymerize, or otherwise react in situ.

SUMMARY OF THE INVENTION

The object of the present invention is to provide a process and apparatus for producing true liquid fogs containing extremely finely divided liquid droplets or particles. A specific object of this invention is to produce a combustible fog which burns with a blue flame and does not produce unconsumed carbon particles which would contaminate the atmosphere. Another object is to produce a combustible fog which can be combusted to produce a reducing gas which is rich in hydrogen and carbon monoxide. Still another object is to produce a fine fog which may be used in inhalation therapy, e.g., for patients afflicted with various types diseases the respiratory system. In accordance with the present invention, true liquid fogs containing very finely divided liquid droplets or particles can be produced by directing a stream of gas at sonic velocities at the orifice of a nozzle or other emission device or source of a liquid spray. The fogs comprise principally droplets ranging less than 10, and generally about 1 to 10, microns in diameter. The densest fogs are produced when the gas stream is at sonic velocity. By increasing the gas stream velocity to supersonic velocities, fogs of lower densities can be produced.

The liquid spray which is used in this invention can be of the "cone-shaped" variety, which is generally produced by relatively high liquid nozzle pressures, or of the "tulip-shaped" variety which is produced at generally lower pressures. Any conventional type of spray can be employed and the invention is not intended to be limited to any particular design of nozzle or spray emission device, nor to any particular type of spray.

In one embodiment, this invention can be used to produce a fog which comprises a combustible mixture of a flammable liquid and air or oxygen or other combustion-supporting gas. When true liquid fogs of hydrocarbon and air produced by the instant invention are burned, the resulting flame is blue and contains virtually no particles of carbon. Thus, an extremely clean flame can be produced, which virtually eliminates all pollution of the air from unconsumed carbon particles. A combustible mixture can be produced in such fogs with only one-half the stoichiometric quantity of air and these fogs produce a reducing gas, principally $H_2 + CO$, which contains no solid carbon and is useful in many commercial processes.

BRIEF DESCRIPTION OF THE DRAWING

The invention may be more fully understood by reference to the accompanying drawing, which is a schematic view of apparatus for producing true dense liquid fogs for use in accordance with the present invention.

DESCRIPTION OF THE PREFERRED EMBODIMENTS

Referring specifically to the drawing, a reservoir 10 is provided for a liquid 34, to be used for making a fog. Any liquid may be used, e.g., a hydrocarbon suitable for combustion or a saline solution suitable for inhalation therapy.

Liquid is withdrawn from reservoir 10 via line 12 and pump 14 and then passes through line 16 to nozzle 20. The nozzle 20 is enclosed in a fogging chamber 18. The nozzle contains an orifice 22 of diameter A. The liquid is emitted from the orifice in the form of a spray having an emission angle E.

A gas such as air, under sufficient pressure to produce a gas stream of at least sonic velocity, is introduced via line 24 and fine tubing 26 having an opening 28 of diameter B. Opening 28 is at a distance C from orifice 22 in nozzle 20.

The alignment of the gas source opening 28 and the liquid orifice 22 is of critical importance. The openings should be aligned so that the sonic gas stream impinges essentially perpendicularly at the opening of orifice 22. Preferably, the angular deviation from the perpendicular is less than about one degree.

The diameter B of the fine tubing opening 28 should be no greater than diameter A of the nozzle orifice 22. Preferably, diameter B ranges about 0.5 to 1 times diameter A and the latter is preferably in the range of from about 0.01 to 0.10 inches. Distance C from opening 28 to orifice 22 is preferably from about 1 to 10 times the diameter B of opening 28.

A gas stream at sonic or supersonic velocity is directed into the apex of the fine spray from nozzle 20 and produces a dense fog which exits from fogging chamber 18 through conduit 30. The dense fog 36 can be combusted or used for inhalation therapy, or in any other use where a dense fog is desired. Multiple sets of nozzles and gas streams may be employed in one fogging chamber and more than one conduit may be provided for the escape of the fog from the fogging chamber. Any liquid 32 not converted to fog can be collected in the bottom of chamber 18 and returned to reservoir 10 through line 40, for recycling to the spray nozzle.

The invention may be more fully understood by reference to the following examples. These examples are illustrative and are not to be taken as limiting the scope of the instant invention.

EXAMPLE 1

A burner producing about 15,000 B.t.u./hr. is constructed in accordance with the instant invention by using 10 nozzles and 10 gas streams at sonic velocity inside a single fogging chamber. The gas used is air at 40 p.s.i.g. supplied by a single compressor. A single reservoir and pump supplies kerosene at 25 p.s.i.g. pressure at a rate of 5 gal./hr. to the spray nozzles. The orifice of the nozzles is 0.016 inches in diameter. The inside diameter of the fine tubings from which the sonic air streams flow is 0.013 inches. The fine tubing openings are positioned 0.10 inches from the orifice of each nozzle and are in axial alignment therewith so that the streams of air are directed perpendicularly at sonic velocities at the orifices which are releasing a fine spray of kerosene. The resultant fog from all ten nozzles is conducted to a single opening and thence to a burner where it is ignited. It burns with a blue flame similar to a flame fueled by natural gas. Kerosene which is not converted to fog in the fogging chamber is continuously recycled.

EXAMPLE 2

An apparatus for inhalation therapy is constructed in accordance with the instant invention by using one nozzle and one gas stream at sonic velocity inside a fogging chamber. The gas used is air at 100 p.s.i.g. A single reservoir and pump supplies saline solution at 25 p.s.i.g. pressure at a rate of 5 gal./hr. The diameter of the nozzle and the fine tubing and the distance from the fine tubing opening to the nozzle orifice are all identical to those in Example 1. The fine tubing opening and the nozzle orifice are positioned in axial alignment. A stream of air at sonic velocity is directed at the orifice which is emitting a fine spray of saline solution. The resultant fog is conveyed to a plastic tent surrounding the head of a patient who breathes the fog into his lungs for theraputic purposes. Saline solution which is not converted to fog in the fogging chamber is continuously recycled.

In no case is it necessary to heat a material which is a liquid phase at normal temperatures and pressures to produce a fog. This advantage over the prior art is most marked in the case of a solution, such as saline solution, when it is desired to convert the solution, including the dissolved solute, into a fog.

It is important to maintain the gas opening and liquid orifice in close alignment and to maintain the component diameters and spacing essentially as described if true liquid fogs are to be produced efficiently and in an economically practical manner.

The specific uses described above are intended to be suggestive and not exhaustive. Applicant claims this unique and unexpected process for producing fogs for all uses and not merely for those set forth in detail above.

I claim:

1. A process for producing a true hydrocarbon liquid fog from a hydrocarbon liquid which comprises forming a directed spray of the liquid from an emission source orifice and directing an opposing stream of gas of at least sonic velocities at the spray emission source from a gas line opening disposed from about 1 to 10 orifice diameters from the emission source orifice and in axial alignment therewith, whereby the fog, containing principally droplets of liquid less than 10 microns in diameter is combusted to produce a flame which is free of solid carbon.

2. The process of claim 1 wherein said combustion produces gases containing principally hydrogen and carbon monoxide.

3. A process for producing a true liquid fog from a liquid comprising:
   a. directing a cone-shaped liquid spray through an orifice into a fogging chamber;
   b. directing a gas stream at sonic velocities at the liquid spray so that the gas stream impinges the liquid spray essentially perpendicularly at the opening of the orifice, whereby the fog containing principally droplets of liquid less than 10 microns in diameter is formed;
   c. emitting the fog from the fogging chamber through at least one conduit; and
   d. recycling any liquid not converted to fog to the orifice.

4. A process for producing a true liquid fog from a saline liquid solution which comprises forming a directed spray of the liquid from an emission source orifice and directing an opposing stream of gas of at least sonic velocities at the spray emission source from a gas line opening disposed from about 1 to 10 orifice diameters from the emission source orifice and in axial alignment therewith, whereby the fog contains principally droplets of said saline solution liquid less than 10 microns in diameter.